July 15, 1958     K. L. KING     2,843,842
TELEMETRIC POSITION SENSING DEVICE
Filed April 22, 1955
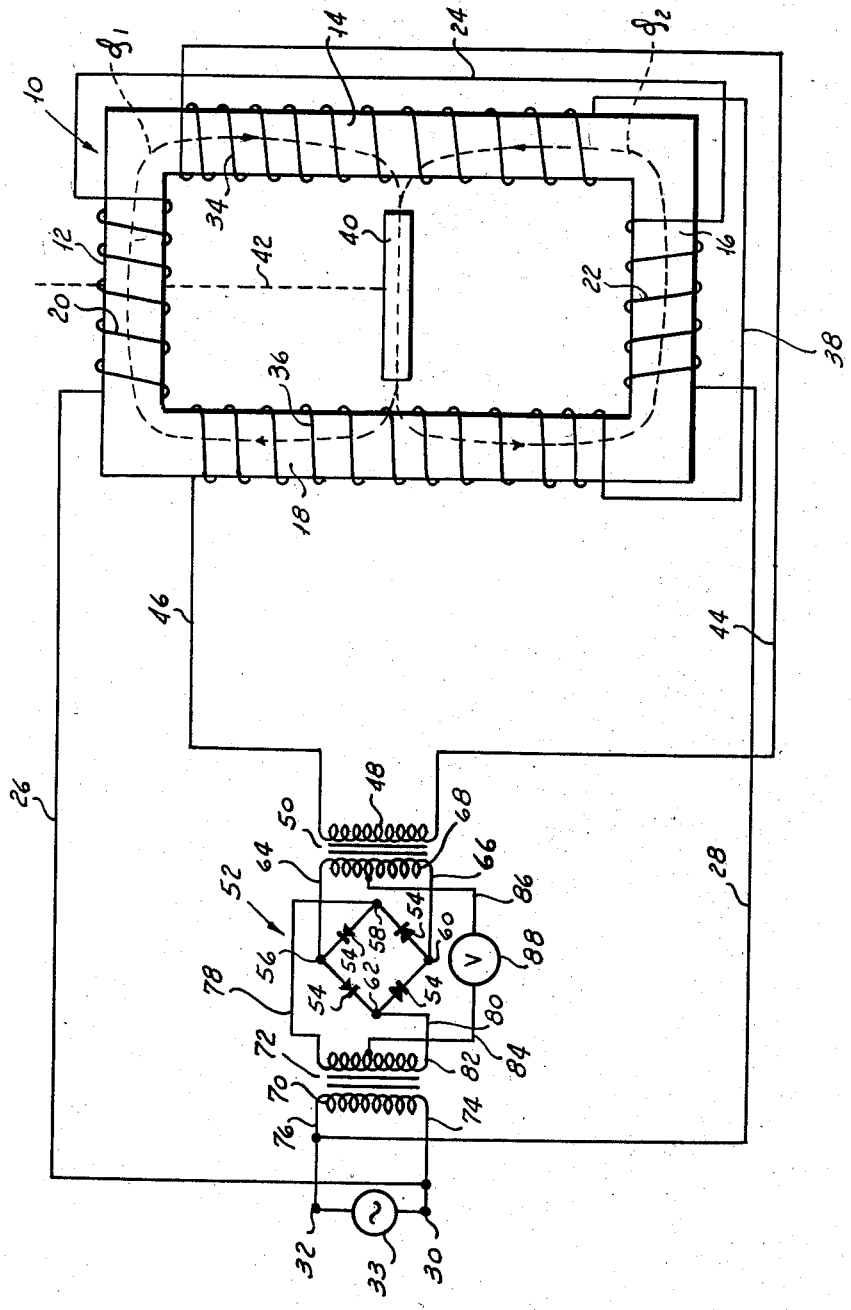
INVENTOR
KENNETH L. KING
BY
ATTORNEY

United States Patent Office 2,843,842
Patented July 15, 1958

2,843,842

TELEMETRIC POSITION SENSING DEVICE

Kenneth L. King, Scarsdale, N. Y., assignor to Norden-Ketay Corporation, New York, N. Y., a corporation of Illinois Application April 22, 1955, Serial No. 503,231

9 Claims. (Cl. 340—199)

My invention relates to a telemetric position sensing device and more particularly to a device for producing an accurate indication of the position of a remotely located movable member.

It is often desirable to obtain an indication at a given location of the position of a remotely located inaccessible movable member. The member whose position is to be determined may, for example, be enclosed in a chamber, or the like, the walls of which are impenetrable so as to make the member inaccessible. A particular example of an installation in which a remote indication of the position of an object is desirable is an elevator system in which a ground floor or cab indication of the floor level of an elevator cab is desired. Devices for obtaining remote indications of the position of a movable member should be simple and inexpensive in construction and certain and accurate in operation. They should employ a minimum number of moving parts so as to require very little maintenance. These devices should be adapted to initiate control operations at certain positions of the movable object whose position is being determined.

I have invented a telemetric position sensing device which produces an accurate indication of the position of a remotely located inaccessible movable member. My device requires very little maintenance, since it employs only one moving part. It is simple and inexpensive in construction and certain in operation.

One object of my invention is to provide a telemetric position sensing device for producing an indication at a given location of the position of a remotely located inaccessible movable member.

Another object of my invention is to provide a telemetric position sensing device which includes only one moving part.

A further object of my invention is to provide a telemetric position sensing device which is simple and inexpensive in construction and which is certain in operation.

Other and further objects of my invention will appear from the following description.

In general, my invention contemplates the provision of a telemetric position sensing device including a pair of series-connected, oppositely wound exciting windings carried by respective opposite legs of an elongated magnetic core to produce oppositely oriented magnetic fields. The remaining core legs carry respective search or sensing windings connected in series-aiding relationship. I movably mount a magnetic shunt of high permeability material between the sensing coil legs for adjustment between the exciting coils. With the exciting coils energized and the shunt equidistant from the respective exciting coils, the voltages induced in the respective portions of the search coils on opposite sides of the position of the shunt cancel, with the result that no signal appears across the series-connected search coils. As the shunt is moved in either direction from this zero voltage position, the search coils produce an output signal, the magnitude and phase of which represent the position of the shunt. I feed this signal to phase-sensitive indicating means for providing an indication of the position along the core of the movable magnetic shunt.

In the accompanying drawing which forms part of the instant specification and which is to be read in conjunction therewith, the figure is a schematic view of my telemetric position sensing device.

More particularly referring now to the drawing, my telemetric position sensing device includes a magnetizable core, indicated generally by the reference character 10, having legs 12, 14, 16, and 18. Legs 12 and 16 carry respective oppositely-wound coils 20 and 22 connected in series by a conductor 24. Respective conductors 26 and 28 connect windings 20 and 22 to the terminals 30 and 32 of a suitable source 33 of alternating current potential. It will be appreciated that the oppositely-wound, series-connected windings 20 and 22 produce oppositely acting magnetic fields in the core 10. The space between legs 14 and 18 of the core provides a leakage flux path for these magnetic fields. For purposes of convenience, I have shown the fluxes of the respective windings 20 and 22 in broken lines and have designated them respectively by $\phi_1$ and $\phi_2$.

The respective legs 14 and 18 of core 10 carry similarly wound sensing windings 34 and 36. A conductor 38 connects windings 34 and 36 in series-aiding relationship.

I dispose a magnetic shunt 40, formed of a suitable highly permeable material, between legs 14 and 18 for movement toward and away from the respective cross legs 12 and 16. A suitable mechanical linkage 42 connects shunt 40 to the member (not shown) whose position is to be determined.

The paramagnetic shunt 40 concentrates the leakage flux from the respective windings 20 and 22 in the position of its location between legs 12 and 16. With the member 40 disposed equidistant from legs 12 and 16 of the core 10, the amount of flux $\phi_1$ linking the halves of windings 34 and 36 above member 40 equals the amount of flux $\phi_2$ linking the halves of windings 34 and 36 below the member 40. Since $\phi_1$ is opposite in direction to $\phi_2$, the voltages induced in each of the respective windings 34 and 36 cancel. As a result, no signal appears across the series-connected search windings 34 and 36 with member 40 in its mid-position magnetically halfway between leg 12 and leg 16 of the core 10.

As the magnetic shunt 40 moves away from its zero sensing voltage output position, midway between legs 12 and 16, the amount of flux $\phi_1$ linking the portions of windings 34 and 36 above the shunt differs from the amount of flux $\phi_2$ linking the portions of windings 34 and 36 below the shunt 40. If shunt 40 moves toward leg 12, the magnetic path of the flux $\phi_1$ is shortened and the magnetic path of the flux $\phi_2$ is lengthened, with the result that more flux $\phi_2$ links the portions of windings 34 and 36 below shunt 40 than the amount of flux $\phi_1$ linking the portions of windings 34 and 36 above the shunt 40. Thus, the voltages induced in the respective windings 34 and 36 by flux $\phi_2$ are greater than the voltages induced in the windings 34 and 36 by flux $\phi_2$, and a signal output voltage, the phase of which is determined by the phase of flux $\phi_2$, appears across the series-connected sensing windings 34 and 36. The magnitude of this signal is proportional to the extent of displacement of member 40 from its mid-position. Similarly, if member 40 moves from its mid-position toward leg 16, an output signal appears across windings 34 and 36, the phase of which is determined by the phase of flux $\phi_1$. The magnitude of this signal is determined by the extent of displacement of member 40 toward leg 16. Since windings 20 and 22 are oppositely wound, the phase of the sensing winding output signal, when member 40 moves toward leg 12, will be opposite to the phase of the sensing winding output signal when member 40 moves toward leg 16. It is to be noted that since the sensing winding output signal results from the action of two oppositely acting magnetic fields produced by the same source of potential, it is not appreciably affected by variations in line voltage or frequency.

Respective conductors 44 and 46 connect the series-connected sensing windings 34 and 36 to the primary winding 48 of one input transformer 50 of a phase-sensitive ring demodulator, indicated generally by the reference character 52. Ring demodulator 52 includes a plurality of unidirectional conducting devices or rectifiers 54, such as crystals, or the like, connected to each other at respective terminals 56, 58, 60, and 62 to form a ring. Respective conductors 64 and 66 connect the secondary winding 68 of transformer 50 to terminals 56 and 60.

I connect the source 33 of electrical energy having terminals 30 and 32 to the primary winding 70 of a second input transformer 72 of the ring demodulator 52 by respective conductors 74 and 76. Respective conductors 78 and 80 connect the secondary winding 82 of transformer 72 to terminals 58 and 62. Conductors 84 and 86 connect a calibrated indicating device, such as a meter 88, between the center tapped secondary windings 82 and 68.

As the magnetic shunt moves in one direction from its mid-position, sensing windings 34 and 36 produce a signal which is in phase with the voltage from the source including terminals 30 and 32, while in the other direction of displacement of shunt 40 from its mid-position the sensing windings produce a signal which is 180 degrees out of phase with the voltage from the source including terminals 30 and 32. With the signal output from the sensing windings 34 and 36 in phase with the voltage from the source including terminals 30 and 32, my ring demodulator 52 produces a full wave rectified output voltage of one polarity between the respective center taps of windings 82 and 68. This voltage is measured by displacement of the needle or the like of meter 88 in one direction from a mid-position. With the sensing signal 180 degrees out of phase with the signal from the source including terminals 30 and 32, my ring demodulator 52 produces a full wave rectified output voltage of a polarity opposite to the polarity of the voltage produced when the source and sensing signals are in phase. The result is a voltage which moves the needle of meter 88 in the opposite direction from the direction it moved when the sensing signal was in phase with the source signal. The magnitude of the voltage on meter 88 in both cases is proportional to the displacement of shunt 40 from its mid-position. It will be appreciated that my ring demodulator provides a phase-sensitive indicating means which may be calibrated to read directly in units of length to indicate the position of shunt 40 along the core 10. While I have shown ring demodulator 52 as my indicating means, I may substitute any other type of phase-sensitive indicating means known to the art.

It is to be noted that my telemetric position sensing device includes no vacuum tubes, which are expensive and which may require replacement after a relatively short period of time. It includes only one movable member, the magnetic shunt 40, which is directly connected to the member the position of which it is desired to indicate. The electrical signal output from the sensing windings may initiate a control operation at any given position of member 40.

In use of my telemetric position sensing device, linkage 42 connects the magnetic shunt 40 to the member whose position is to be indicated. Core 10 and its windings may be located internally or externally of a chamber enclosing the member whose position is to be indicated. The member whose position is to be measured carries the shunt 40. If shunt 40 is in its mid-position halfway between legs 12 and 16, the magnetic fields produced by the respective exciting windings 20 and 22 induce voltages in the portions of windings 34 and 36 on one side of the shunt 40 which are equal and opposite in phase to the voltages induced in the portions of windings 34 and 36 on the other side of the shunt 40. As a result, the voltages induced in the respective windings 34 and 36 cancel and the series-connected sensing windings 34 and 36 produce no output signal. In this position of the shunt 40 the needle of meter 88 occupies its mid-position.

When member 40 moves away from its mid-position toward one of the legs 12 or 16 of core 10, the sensing windings 34 and 36 produce an output signal which is either in phase with or 180 degrees out of phase with the signal from the source 33. With the shunt 40 displaced in the other direction from its mid-position toward one of the legs 12 or 16, the sensing windings 34 and 36 have an output signal which is opposite in phase to the phase of the signal when the shunt 40 moved away from its mid-position in the other direction. If the signal from sensing windings 34 and 36 is in phase with the source signal, ring demodulator 52 produces a full wave rectified output voltage of a polarity to deflect the needle of meter 88 in one direction from its mid-position. If the signal from sensing windings 34 and 36 is out of phase with the source signal, ring demodulator 52 produces a full wave rectified output voltage of a polarity to move the needle of meter 88 in the other direction from its mid-position. The magnitude of the voltage on meter 88 in both directions of displacement of shunt 40 from its mid-position is proportional to the amount of displacement. Meter 88 is directly calibrated in units of length to indicate the position of shunt 40 along core 10 between legs 12 and 16.

It will be seen that I have accomplished the objects of my invention. I have provided a telemetric position sensing device which gives an accurate indication of the position of a remotely located inaccessible movable member. My device includes no expensive vacuum tubes or choppers. It has only one moving part and requires little maintenance. It is simple in construction and certain and accurate in operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A telemetric position sensing device including in combination a magnetic core having a pair of legs and an elongated portion connecting said legs, a first exciting winding carried by one of said legs, a second exciting winding carried by the other of said legs, means for energizing said first and second exciting windings to produce oppositely acting fields of magnetic flux, a sensing winding positioned on said elongated portion in a position to be influenced by both said fields, and a movable magnetic shunt disposed adjacent said elongated portion for movement along the length of said portion to vary the respective flux path lengths of said first and second winding magnetic fields.

2. A telemetric position sensing device including in combination a closed magnetic core having a pair of legs and a pair of elongated portions connecting the legs, a first exciting winding carried by one of the legs, a second exciting winding carried by the other of the legs, means for energizing said first and second exciting windings to produce oppositely acting fields of magnetic flux, a sensing winding carried by one of said elongated portions in a position to be influenced by both said fields and a movable magnetic shunt disposed within said core for movement in the direction of the length of the elongated portions to vary the respective flux path lengths of said first and second winding magnetic fields.

3. A telemetric position sensing device including in combination a closed magnetic core having a pair of legs and a pair of elongated portions connecting the legs, a pair of exciting windings carried by the respective legs, means for energizing the exciting windings to produce a pair of oppositely acting fields of magnetic flux, a pair of sensing windings carried by the respective elongated portions in positions to be influenced by both said fields, a movable magnetic shunt disposed within the core for movement in the direction of the length of the elongated portion to vary the respective flux path lengths of said first and second winding magnetic fields and means for connecting the sensing windings in series-aiding relationship to produce an output signal the magnitude and phase of which are representative of the position of said shunt along said elongated portions.

4. A telemetric position sensing device as in claim 3 including a phase-sensitive indicating device and means for impressing said output signal on said indicating device.

5. A telemetric position sensing device as in claim 3 including a ring demodulator having two pairs of input terminals and a pair of output terminals, said means for energizing the exciting windings including a source of electrical potential, means connecting said source to one pair of said ring demodulator input terminals, means for impressing said sensing windings output signal on the other pair of said input terminals, and indicating means connected to said output terminals.

6. A telemetric position sensing device as in claim 3 in which the length of said sensing windings is greater than the length of said exciting windings.

7. A telemetric position sensing device as in claim 3 in which the core is rectangular.

8. A telemetric position sensing device as in claim 3 in which said shunt is a piece of paramagnetic material elongated in the direction of the length of said legs.

9. A telemetric position sensing device as in claim 3 in which said exciting windings are oppositely wound and series connected.

References Cited in the file of this patent

UNITED STATES PATENTS

| | | |
|---|---|---|
| 2,459,210 | Ashcroft | Jan. 18, 1949 |
| 2,494,579 | Pimlott | Jan. 17, 1950 |